106. COMPOSITIONS,
93 COATING OR PLASTIC.

Patented June 28, 1938

2,122,192

UNITED STATES PATENT OFFICE 2,122,192

ROOFING OR SHEET PRODUCT

Clements Batcheller, Portsmouth, N. H.

No Drawing. Application December 23, 1933,
Serial No. 703,846

7 Claims. (Cl. 18—47.5)

My invention relates to improvements in roofing or sheathing products of the rigid type and more specifically to the production of articles of this general character in which fibrous material is incorporated as an aggregate with hydraulic cement, water and asphalt emulsion to form a semi-flexible structure, or at least a structure which will be endowed with considerable resistance to checking and cracking when subjected to shock, and which may be flexed to a substantial degree without fracture. It also relates to an improved product of this type which will not effloresce and which is better than and may be made much more cheaply than similar products now available.

It is well known that all products of the cement-asbestos type such as sheets, shingles or tiles have many basic defects which are inherent to synthetic structures of this kind irrespective of the method employed in making them or of the care exercised in proportioning their ingredients. For example, the average product of this type will absorb and retain moisture to the extent of from 10% to 12% of its weight. Several waterproofing preparations, composed mostly of silico-fluorides, have been placed upon the market but their application to roofing and sheathing products has not been successful due to the fact that they increase the brittleness and hardness of a product which is already so lacking in toughness and resistance to flexural stress that breakage losses are unusually high. Moreover this inherent fragility increases with age due to the characteristic property of hydraulic cement to increase in hardness as long as moisture is present in the product to continue the process of hydration.

Another defect is the tendency of such products to effloresce or "bloom" when exposed to atmospheric conditions under which carbon dioxide from the air unites with the calcium hydrate (uncombined lime) in the product to form upon the surface an insoluble film of calcium carbonate. This bloom is particularly unsightly in any case and is especially detrimental to the appearance of a product where it is color decorated.

I find that all of these defects can be overcome by a rather simple expedient. Moreover, by a slight modification in procedure a much cheaper and better product than has heretofore been known can be manufactured. By employing the procedure described below a distinctly new and improved roofing or sheathing product is produced which is substantially impervious to moisture, can be flexed to a considerable extent without fracture and which will not effloresce. These new products differ materially in appearance, texture, and in their physical properties from those of the prior art.

I have found that the addition of small percentages, say between 0.25% and 10% by weight, of a water miscible asphalt emulsion to standard and special mixtures of hydraulic cement-fibre plastics produces striking results in the correction of the basic defects which heretofore have been inherent in all products of this character.

Many types of asphalt emulsion have been tried and all seem to work equally well. There is very little or no difference in the physical properties of my products when produced from asphalt emulsion containing a colloidal clay base or made from an asphalt emulsion containing an insoluble soap base.

In producing roofing and sheathing products from standard mixtures of cement and asbestos fibres, I find that the addition of asphalt emulsion in quantities as small as about 1% or even less by weight of the product will produce a non-brittle, semi-flexible product which is almost entirely non-absorbent to moisture and therefore waterproof.

Breaking tests made on standard equipment show extremely high flexural strength and a marked absence of the brittle-hardness characteristic of like products in the prior art. Samples 10 inches long by 3 inches wide and ¼ of an inch thick when submitted to transverse loading tests under the usual procedure showed a deflection at the center of 3⅜ inches without any undue signs of rupture. Upon further tests at the age of three months, the products showed an entire absence of the usual hardness and brittleness characteristic of the common product. The products when subjected to an accelerated efflorescence test by heating them in a steam bath and then subjecting them to sudden chilling at low temperatures indicate a perfect resistance to the absorption of carbon dioxide. Other samples subjected to prolonged tests under ordinary atmospheric conditions give equally satisfactory results. These tests, I believe, clearly demonstrate that the presence of the finely dispersed asphalt particles in close association with the lime particles of the cement together with the fine superposed asphalt film which is deposited over the surfaces of the product by the hydraulic pressing operations form a perfect barrier to the absorption of atmospheric carbon dioxide by the active lime in the product, thus effectively and permanently preventing any tendency of the product to bloom in service.

When the asphalt emulsion content is raised to as high as 4% by weight of the plastic mixture, the resulting products show a very great increase in flexibility, in fact almost enough to remove them from the "asbestos" or rigid shingle class. At the same time it may be noted that the product displays a very attractive color decoration due to the typical brown color of the asphalt. The surface texture is very smooth and almost polished, and, when wheel buffed will show a very high and permanent glossy finish. The products shear and punch readily and the new material is very easy to apply because of its great toughness and semi-flexibility.

It is to be understood that my invention is not limited in its application to products in which the fibrous aggregate is entirely of asbestos but that it may be used to great advantage with composite fibrous aggregates whereby the cost of the finished products is substantially reduced.

It is well known that the principal material cost in asbestos shingles or sheet products is the cost of the asbestos fibres which ordinarily constitutes about 15% by weight of the product. In the manufacture of shingles a grade of asbestos known as "shingle stock" may be successfully used, but a longer and more expensive grade of fibre is necessary for the production of similar material in the form of sheets. Due to the relatively high cost of the asbestos fibres, as pointed out above, many attempts have been made to find a cheaper material which could be satisfactorily substituted therefor, either in whole or part. Vegetable fibres have been tried with varying and never satisfactory results. Such fibres will absorb more or less moisture, and a close adhesive bond cannot be effected between the surfaces of the vegetable fibres and the colloids of the cement due to a gradual but nevertheless positive warping and shrinking of the fibres during the hydration of the product. Moreover vegetable fibres lying in or near the exposed surfaces of the finished product ultimately disintegrate and decompose, and thus, not only produce pitting but permit moisture to permeate the product with ultimate disintegration of the entire structure which is particularly rapid under conditions of alternate freezing and thawing.

I find that these defects in the products arising from the use of vegetable fibres as an aggregate can be overcome by the use of small percentages of asphalt emulsion preferably in the manner hereinafter set forth.

As a substitute, either in whole or part for asbestos, waste hard or soft wood fibres, such as pulp screenings, may be employed, although hard wood fibres such as accumulate from the manufacture of birch and maple products are preferred because of their comparatively high flexural and tensile strength.

Instead of forming a plastic mixture of fibres and hydraulic cement and incorporating the asphalt with the plastic mixture, where vegetable fibres are employed, I prefer to incorporate the asphalt emulsion by first treating the vegetable fibres therewith. This may conveniently be done by agitating the fibres in a suitable container with a mixture of hot water and asphalt emulsion until they are thoroughly coated and perhaps to a slight degree impregnated with the asphalt. The asphalt covered fibers are then further coated by adding thereto a suitable water plastic mixture of colloidal clay of the nature of bentonite and thoroughly mixing it therewith.

Due to the fact that a water miscible asphalt emulsion cannot be brought to a workable plastic state after the emulsion has lost the water content by evaporation or otherwise, I prefer that the fibers when still wet from the treatments described above be incorporated with a hydraulic cement, and mineral fibres, if desired, and rolled into the plastic product. This, of course, is not absolutely necessary but if the fibres are permitted to dry, the resulting composition must be re-shredded before incorporating with the hydraulic cement and other material, if any.

A microscopic examination of a dry fibre which has been thus coated with films of asphalt and colloidal clay indicates a satisfactory bond between the fibre and the asphalt and the asphalt and the colloidal clay. Moreover laboratory tests of the fibre so treated indicate a decided increase in the tensile strength thereof due undoubtedly to the slight impregation of the fibres by the asphalt and to the presence of the asphalt and clay deposits upon the surface thereof.

Because of the great flexural and tensile strength of the vegetable fibres so treated as compared with mineral fibres of like size, it is possible to substitute them for the best and most expensive grades of mineral fibres and a composite mixture composed partially of my treated vegetable fibres and partially of the shorter and cheaper grades of asbestos fibres will effect a decided economic saving in material costs and produce a better product than has heretofore been known.

My products can be formed from a plastic mixture of hydraulic cement, asphalt emulsion and mineral fibre or from the same ingredients plus vegetable fibres with which asphalt emulsion is first incorporated. Any of the equipment now used in the art may be employed but I prefer the mechanical equipment disclosed in my application Serial No. 553,818 in which, generally speaking, the plastic material is rolled to a desirable thickness and thereafter subjected to substantial pressure whereby a very dense, compact product is produced. The pressing operation brings to the surface of the product a thin superposed film of asphalt which is uniformly deposited and which forms a perfect barrier to the absorption of moisture or atmospheric carbon dioxide.

Comparative tests of my finished products containing vegetable fibers treated as above set forth and standard cement asbestos products disclose that vegetable fibres so treated are a prefectly satisfactory and cheap substitute for the long high grade mineral fibres now necessarily used in the production of roofing and sheet products. In addition, my products are distinctly non-brittle, have high flexural strength, and a high modulus of rupture. Furthermore they are much more impervious to moisture than are the cement asbestos products now known in the art, and they will not effloresce.

Vegetable fibres when treated according to my process and used in combination with mineral fibres of equal or lower quality than standard can be used as a satisfactory substitute for straight asbestos fibres and can be satisfactorily mixed and bonded with hydraulic cement. The fibres so processed are permanently waterproofed and consequently rot-proof so that in these respects they are not only comparable to but better than asbestos.

The method of procedure and the product herein described and claimed are to be understood as differing distinctly from the procedure and products claimed in my copending application Serial No. 703,845, now Patent No. 2,041,041. The product claimed in said patent is a laminated structure and the method claimed therein is the method of making a product consisting of two or more layers of material which differ somewhat in their characteristics. In this application, the product is formed entirely from a single cement-fiber mixture and, except for the possibility of a thin superficial film somewhat higher in asphalt than the body of the product and which may be brought to the surface in the pressing operation, is of uniform character throughout. Hence, by the phrase, "of substantially uniform character throughout", as used in the claims, I mean to exclude products built up of laminae having different characteristics but I do not mean to exclude products which merely have a superficial layer thereon in which the asphalt is somewhat more concentrated than in the body of the product due to the extrusion thereof in the pressing operation.

While I have described my invention in its preferred embodiment, it is to be understood that the words which I have used are words of description and not of limitation. Hence, changes within the purview of the appended claims may be made without departing from the true scope and spirit of my invention in its broader aspects.

What I claim is:

1. The method of making a roofing or sheathing product of the cement-fiber type which comprises pre-coating vegetable fibers with asphalt emulsion, coating the asphalt covered fibers with colloidal clay of the order of bentonite, intermixing said fibers while plastic with hydraulic cement and water to form a plastic mass, rough forming the product from said plastic, and thereafter subjecting it to substantial pressure to form a dense, hard product.

2. The method of making a roofing or sheathing product of the cement-fiber type which comprises pre-coating vegetable fibers with asphalt emulsion, coating the asphalt covered fibers with colloidal clay of the order of bentonite, intermixing said fibers while plastic with asbestos fibers and cement to form a plastic mass, rough forming the product from said plastic, and thereafter subjecting it to substantial pressure to form a dense, hard product.

3. A roofing or sheathing product characterized by its resistance to efflorescence and comprising a hard, dense sheet unit formed substantially of hydraulic cement and fibrous materials including vegetable fibers coated with a film of asphalt and colloidal clay of the order of bentonite whereby said vegetable fibers are rendered waterproof, and containing, in addition, asphalt in a quantity from about 0.25% to about 10% of the combined weight of the cement and fibrous material.

4. A roofing or sheathing product characterized by its resistance to efflorescence and comprising a hard, dense sheet unit formed principally of hydraulic cement, asbestos fibers, and vegetable fibers coated with a film of asphalt and colloidal clay of the order of bentonite whereby said vegetable fibers are rendered waterproof, and containing, in addition, asphalt in a quantity from about 0.25% to about 10% of the combined weight of the cement and fibrous material.

5. Those steps in the method of making a hard, dense roofing or sheathing product of the cement-asbestos type formed of a plastic mixture comprising principally hydraulic cement, asbestos fiber and vegetable fiber, which comprises coating the vegetable fibers with a water-miscible asphalt emulsion and thereafter coating the asphalt coated fibers with colloidal clay of the order of bentonite before incorporating them in said plastic composition.

6. Those steps in the method of making a hard, dense roofing or sheathing product of the cement-asbestos type formed of a plastic mixture comprising principally hydraulic cement, asbestos fibers and vegetable fibers which comprise coating the vegetable fibers with a water-miscible asphalt emulsion, coating the asphalt coated vegetable fibers with colloidal clay of the order of bentonite and thereafter intermixing the coated vegetable fibers while wet with the asbestos fibers and the cement.

7. A roofing or sheathing product characterized by its resistance to efflorescence and comprising a hard, dense sheet unit formed substantially of hydraulic cement and fibrous materials including vegetable fibers coated with a film of asphalt and colloidal clay of the order of bentonite whereby said vegetable fibers are rendered waterproof, and containing, in addition, asphalt in a quantity from about 1% to about 4% of the combined weight of the cement and fibrous material.

CLEMENTS BATCHELLER.